Figure 1:
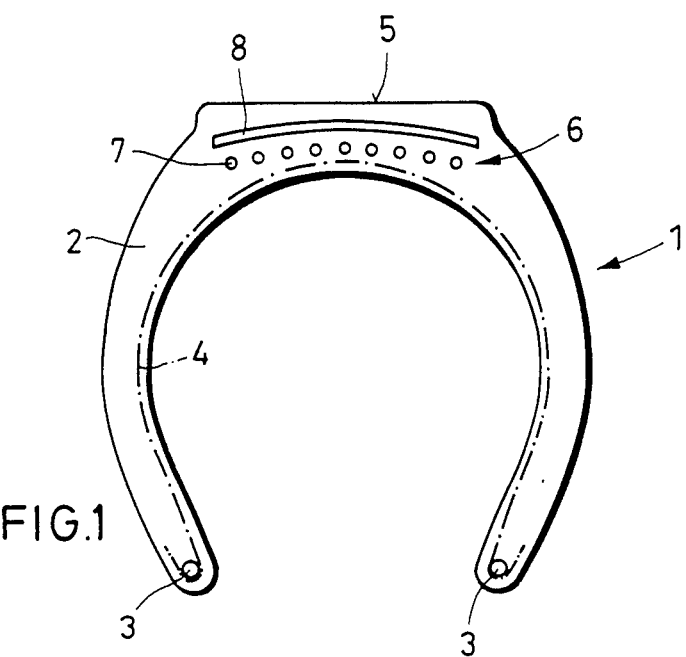

United States Patent [19]

Janus

[11] Patent Number: 4,809,758
[45] Date of Patent: Mar. 7, 1989

[54] BELTED TIRE FOR VEHICLES

[76] Inventor: Jonny Janus, Kreuzstrasse 53, D-4000 Düsseldorf 1, Fed. Rep. of Germany

[21] Appl. No.: 57,500

[22] Filed: Jun. 3, 1987

[30] Foreign Application Priority Data

Oct. 18, 1986 [DE] Fed. Rep. of Germany ....... 3635491

[51] Int. Cl.$^4$ ............................................... B60C 9/18
[52] U.S. Cl. .................................. 152/531; 152/535; 152/536; 152/537
[58] Field of Search ............... 152/526, 528, 530, 531, 152/532, 535, 536, 537, 538

[56] References Cited

U.S. PATENT DOCUMENTS

| | | | |
|---|---|---|---|
| 1,009,364 | 11/1911 | Wirt | 152/538 X |
| 3,093,181 | 6/1963 | Beckadolph | 152/531 |
| 3,342,239 | 9/1967 | Olagnier | 152/531 |
| 3,842,884 | 10/1974 | Bertrand | 152/531 |
| 3,978,161 | 8/1976 | Nielsen et al. | 525/360 |
| 4,098,315 | 7/1978 | Ferrell et al. | 152/533 |
| 4,111,249 | 9/1978 | Markow | 152/526 |

FOREIGN PATENT DOCUMENTS 1198691 8/1965 Fed. Rep. of Germany ...... 152/535
2070526 9/1981 United Kingdom ............... 152/531

Primary Examiner—Michael W. Ball
Assistant Examiner—Ramon R. Hoch
Attorney, Agent, or Firm—Schweitzer & Cornman

[57] ABSTRACT

Disclosed is a belted tire for vehicles, which comprises a toroidally curved body of elastic material with a tread surface at the outer periphery and a peripherally extending annular belt construction which is embedded as an insert in the elastic material of the body in the region of the tread surface and which comprises two parts, namely a peripheral belt for peripheral stiffness and a transverse belt for transverse stiffness, wherein the peripheral belt has a number of annular strength supports which are arranged in laterally spaced juxtaposed relationship in at least one plane and which extend in the peripheral direction of the body, and the transverse belt has at least one transverse bracing strength support which extends approximately over the width of the tread surface and which is embedded in the elastic material in parallel relationship and at a spacing from the peripherally extending strength supports of the peripheral belt, and wherein the transverse belt is stretchable in the peripheral direction of the tire at least as much as the strength supports of the peripheral belt.

6 Claims, 3 Drawing Sheets

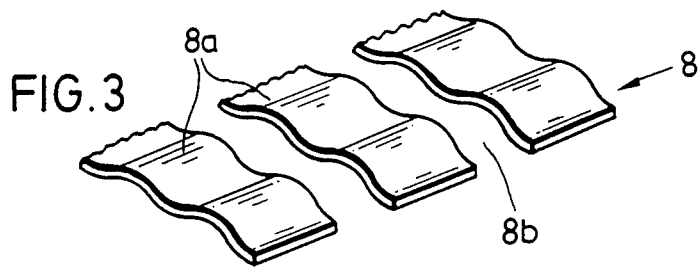
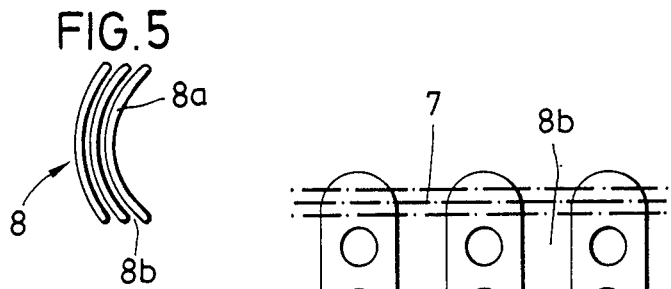
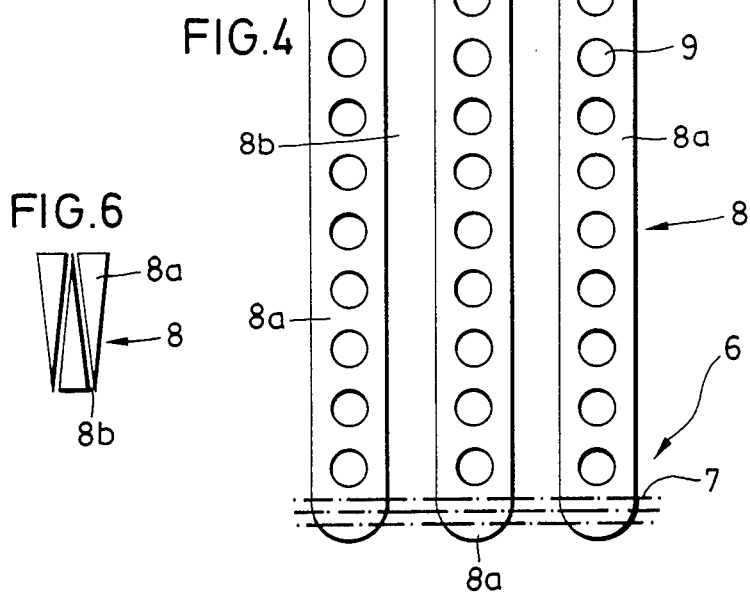
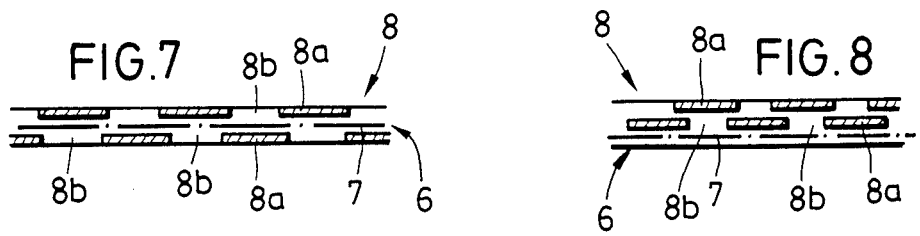

BELTED TIRE FOR VEHICLES

DESCRIPTION

The invention relates to a belted tire comprising a toroidally curved carcass body which has a contact or tread surface and side flanks, reinforcing inserts which are preferably arranged transversely with respect to the direction of travel of the tire, and an annular belt construction which extends between two lateral shoulders in the direction of movement of the tire.

In the conventional construction of belted tires, the belt layer comprises a cord fabric material which is arranged in a plurality of plies in superposed crossed relationship, preferably of thin steel wires, that design causing the material used to extend diagonally with very short cut lengths. That design configuration is intended to make the belt peripheryally stiff and transversely stiff at the same time. In actual fact those two criteria are decisive in regard to the travel-dynamic qualities of belted tires, that is to say, peripheral stiffness without adequate transverse stiffness is unacceptable. That gives an angle of about 25° or about 335° in regard to the cord fabric layer, relative to the 0° direction (periphery). In that respect the conventional belted construction has achieved an acknowledged high standard. In that arrangement the individual cords are only a little longer than the belt is wide and thus only a comparatively small adhesion area is available for the surrounding rubber material, as is necessary for feeding in the forces to be transmitted.

The cord fabric which is arranged in a plurality of plies in superposed relationship is encased with caoutchouc or rubber material so that as a by-product, considered generally, there is an excessively large cross-sectional thickness in the multiply belt layer with an undesirably high degree of radial stiffness which opposes a very high level of resistance to deformation in regard to the necessary flattening of the tire in the contact or patch area. In some cases attempts are made to cover the weak points of that construction by additional cap portions of nylon or steel cord in the 0° position, in other words, the steel belt which is constructed in a crossed configuration receives for example a shoulder bandage in order to support that weak point which arises out of the very design of the tire.

In conjunction with a high air pressure, a belted tire of that kind scarcely still flattens out correctly so that although the distribution in respect of pressure occurs in a really uniform manner and the formation of a pressure trough can be reduced, the short length over which the tire flattens out is no longer sufficient to provide an adequate contact or patch area for transmission of the travel-dynamic forces, with a given width of tire, or to afford an adequate level of comfort. That results in the known requirement to increase the width of the tire in order to provide the necessary contact patch area. As that has a visually good effect, that necessity can be sold as a virtue. However that design configuration results not only in a limited degree of comfort, specifically high level of internal working, a serious risk of acquaplaning and a higher degree of air resistance, but it also results in excessive use of expensive material of limited resources, high weight and high costs. Examples of previously known tires are to be found in German patent specification No. 1 194 720, German utility model No. 1 701 521, British patent specification Nos. 802 951 and 359 917, French No. 112 731 and French patent specification No. 96 122.

In another known belted tire (German laid-open application (DE-OS) No. 23 55 489), the stiffening layer which is embedded in the tread region and which serves as a belt layer comprises a band of high-strength homogeneous material which is formed into an endless ring with closed side edges and which is provided over its entire periphery with openings which are closed off relative to each other. The openings are arranged in juxtaposed relationship in a plurality of rows disposed in succession over the axial width of the band. That construction is intended to provide a belt-like stiffening insert which is simple to produce, with a comparatively small amount of material being used and without a substantial increase in weight, while maintaining the continuous adhesive bonding between the carcass portion and the tire tread portions which are applied to the belt layer.

A belted tire with a stiffening insert of that kind however cannot adequately adapt itself in its transverse direction to highway irregularities, particularly when travelling over transvrse corrugations or bumps. The belt thereof acts like a foreign body in the elastic rubber construction and, because of inadequate adhesion to rubber and the waste heat which is produced by the intensive mechanical work that results, it gives rise to detachment phenomena in the tire, which results in total failure. Another serious disadvantage is that the belt layer in that form is totally rigid and is therefore not capable of performing the stretching and compression movements which are necessary to a limited extent, in the peripheral direction.

Although a belted tire for vehicles is also known (German laid-open application (DE-OS) No. 27 22 923) in which the belt for tread surface stabilisation has a plurality of separate coaxial bands which are axially separated from each other by regions which admit local tread surface deformation in the event of lateral forces applied to the tread surface, thereby providing a tire whose tread surface has better ground contact in particular when passing over irregularities, in that known tire however each of the coaxially juxtaposed bands or each ring comprises fine steel cord wires, thus forming bands which are flexible but which are substantially inextensible in the peripheral direction of the tire and which, after stretching which is typical of the cord wire, limit a radial increase in size of the loaded tire. Of three juxtaposed bands, the two outer bands each comprise a band which is folded through 180° in the vicinity of the respective shoulder of the tire while the center band comprises two parallel superposed layers of wires and does not have any folding.

Even if such a configuration of the stiffening inserts of the tire already provides for adaptation of the individual ring portions of the belt layer when the tire is travelling over highway irregularities, those known belt layers or bands of fine steel cord wires however are of comparatively large overall cross-sectional thickness, thus giving a high movement of inertia and adversely affecting the rolling properties and in particular the rolling resistance of the tire. In addition that construction does not have the necessary transverse stiffness.

All known belted tires suffer from a further problem in that the elastic tire material is loaded to a substantially higher degree in the region of the shoulders than in the middle region of the contact or tread surface, when the tire is moving, due to the actual tire construction, because the belt edges exert substantial shear movements in the shoulder region, as a result of flattening of the tire which constantly changes the position of the belt edges. Also superimposed thereon are centrifugal loadings deriving from parts of the tire side walls. That high loading on the tire shoulders results in increases in temperature which may locally be far above 180° so that the rubber of the tire is damaged in those areas and begins to peel off the rubber, starting from the shoulder areas.

The belt which supports the carcass in the region of the contact or tread surface cannot adequately support the shoulders of the tire as the belt edges cannot follow the tire shoulders which goes from the tread surface area into the side walls (see in that respect German laid-open applications (DE-OS) Nos. 31 39 770 and 27 15 724).

All previously known belted tires suffer from a further problem in regard to loading and increased heating due to the fact that the belt insert, in the region of the contact patch area formed by flattening of the tire, changes from a tensile stress to a compression stress, that is to say, it is subjected to an upsetting force. In that connection the man skilled in the art is aware of 'pressure troughs' which resist equalised pressure distribution. That not only gives rise to uncontrollable deformation phenomena and thus wear-increasing sliding phenomena in the contact region of the belted tire with irregular wear (for example the centre of the tire wears away), but it also gives rise to a comparatively high level of rolling resistance in the moving tire. That in turn results in a greater rise in temperature and thus a reduced service life and operational reliability and safety.

The invention is based on the object of providing a belted tire which, while being of a light construction, has both the necessary peripheral stiffness and also the necessary transverse stiffness and which affords a high level of travelling comfort with a low level of rolling resistance.

In accordance with the invention, in a tire of the kind set forth in the opening part of this specification, that object is attained by the features recited in claim 1. Advantageous embodiments of the invention are the subject-matter of the subsidiary claims.

The invention improves the known belted tires in that a construction element of the belt is designed in the optimum fashion for achieving the necessary peripheral stiffness and a further construction element of the belt is designed to guarantee the essential transverse stiffness, and both elements co-operate with each other in a supplemental fashion to provide a novel belt. That avoids the costly compromise of the belted tires of conventional construction, namely the high degree of radial stiffness. The novel combination of mutually supplemental elements reduces the internal work involved, avoiding the harmful effect when changing from a condition of tensile stress to a condition of compression stress in the contact patch area of the belted tire, it provides for a uniform distribution of pressure, it makes it possible to use lighter materials which can be better joined to rubber, and it lowers the weight and the cost of the belted tire.

The disturbance in the periphery of the tire due to the flattening thereof is substantially restricted to the contact patch area, as has been demonstrated by high-speed tests at up to 280 kph, so that troublesome rolling beads, standing waves and an increase in the radius of the tire in the non-loaded peripheral portion can be substantially avoided. The belt insert and the layer of rubber surrounding same are operated as far as possible only under conditions of tensile stress, corresponding to the ideal operating principle of the pneumatic system, so that there are scarcely any harmful compression stresses in that system.

On those premises, the invention represents a novel technical teaching in tire design and is in contrast to the technical teaching which is applicable at the present time and which provides that the belt is to be as stiff as possible (in order to compensate for differences in the distribution of pressure with the impending change in stress), and that the use of thermoplastic materials in tire construction is not possible.

In accordance with a preferred embodiment of the invention, the belt elements forming the belt insert are put under tensile stress when the tire is inflated with air and under the operationally induced centrifugal force, so that they store energy with the limited stretch which occurs. In figurative terms that can be represented as the work of a spring which is limited by an abutment and which, upon the passage of the contact patch chord of the tire, is contracted out of its own energy and thereafter is stretched again. When the tire is flattened in the contact patch region thereof, the strength support of the peripheral belt, together with the rubber material surrounding same, liberate the stored energy again so that in notional terms no external energy has to be supplied for the adaptation in respect of length (deformation) of the larger arcuate portion to provide the shorter contact patch chord, and the peripheral distrubance remains limited virtually to the contact patch area. In that situation the strength supports are restored only approximately to the stress-less condition so that in operation the belt elements generally cannot be subjected to a compression or upsetting effect. In the region of the tire tread the belt insert is stretched in such a way that almost no troublesome extension movements can any longer occur in the peripheral direction. The rubber material of the tire, around the belt insert, is also subjected to a tensile stress as a result of stretching of the belt insert. Accordingly, in the region of the flattening of the tire, not only the belt elements but also the rubber material surrounding same are restored to the original stress-free condition to a greater or lesser extent so that in the region of the flattening of the tire the belt insert does not have to overcome the resistance to deformation of the rubber, that is to say there the limited return deformation of the rubber takes place not against but with the strength supports. That kind of deformation gives a clear reduction in rolling resistance of the belted tire in operation thereof. Comparative temperature measurements have given a temperature of 185° in the shoulder region in massproduced steel belts, but only 100° in the combination belt according to the invention. The reduction in rolling resistance can be further enhanced by the belt elements being produced, with their lateral profile, in such a way that it approximately corresponds to the return deformation which subsequently occurs in the flattening region of the tire (in a stress-free condition). In this case also the operating stress in the belted tire causes the desired stretching or extension of the belt insert as well as the rubber material surrounding same of the tread strip. The operating pressure which is required in any case in the tire as well as centrifugal force are thus additionally used as energy donors in order to reduce rolling resistance.

The particular advantages of the invention are achieved, generally speaking, by making up the belt from two elements, namely a peripheral belt for the peripheral forces and a transverse belt for the transverse forces, which are both so designed that they can also carry to a considerable extent forces for which the other belt element is intended.

The invention also causes a reduction in the rolling resistance of the tire, by a reduction in the deformation work in the flattened region thereof, in that the deformable components of the tire, that is to say the belt elements and the rubber material, have 'return deformation functions' which correspond to the magnitude of the material prestressing and/or construction stretch and material stretch, which are produced in the flattened region of the tire due to the operating pressure. That avoids uncontrollable material deformation phenomena which result in distortion of the tread surface of the tire.

The annular arrangement of the strength supports of the peripheral belt, extending therefore in the peripheral direction, as a result of the better utilisation of their strength potential, means that it is also possible to use thinner and lighter textile or synthetic fibre cords. Radial stiffness, weight and costs can be further reduced by using those materials and the reduction in cross-section.

It is advantageous that the entire material of the peripheral belt is used exclusively only for carrying the annular tensile forces which occur. The otherwise usual involvement of material for strength supports which extend in a diagonal direction is completely eliminated as the function of such supports is performed by the radial cord loops of the carcass and in particular by the transverse belt.

Any suitable materials, in particular steel alloys which have a high level of tensile strength, but also carbon fibres, textile cords or the like, may be used for the rings or bands of the peripheral belt layer.

In accordance with the invention, the entire belt, in the peripheral belt, has a number of strength supports which extend at a lateral spacing from each other and in juxtaposed relationship, while in the transverse belt the belt construction has at least one transverse bracing element which extends substantially peripendicularly and which extend substantially substantially over the width of the contact patch area of the pneumatic tire and which, by virtue of its plate or sandwich action, covers an angular spectrum of 0° to 90° or 360° to 270°. The strenght supports of the peripheral belt may be arranged for example at what is known as the zero degrees position, that is to say they may extend in the peripheral direction of the belted tire. The belt therefore so-to-speak comprises two construction elements, namely the peripheral belt and the transverse belt.

The strength supports of the transverse belt may be disposed both over and under the strength supports of the peripheral belt in the tire material.

The transverse belt comprises for example at least one plastic foil which is disposed in an annular configuration in the peripheral direction of the pneumatic tire and which is corrugated transversely with respect to the strength supports of the peripheral belt. Although such an insert is flexible in the peripheral direction of the tire when constructed in that manner and therefore makes virtually no contribution to peripheral strength, it does however impart a very high level of transverse stiffness to the tire, by virtue of the high moment of resistance in the transverse direction.

In that connection the transverse bracing element may comprise an single or a plurality of corrugated bands which are arranged in an annular configuration in juxtaposed relationship and which are embedded into the material of the tire body. An insert of a plurality of juxtaposed bands also imparts a high degree of transverse stiffness to the pneumatic tire so that the strength supports of the peripheral belt may be arranged in the zero degrees position and accordingly it is possible to make full use of the strength properties thereof. Correspondingly, the peripheral belt does not need to be over-dimensioned in order to achieve the necessary transverse stiffness.

In accordance with a practical embodiment of the invention, the strength supports of the transverse belt are thin narrow bands or strips of finite length, which extend substantially in the transverse direction and which are arranged in the belted tire in distributed relationship over the periphery of the tire at spacings from each other in such a way that they impart to the tire a high degree of stiffness in the transverse direction with at the same time bendability or flexibility in the peripheral direction.

Preferably the strength supports of the transverse belt, in band or strip form, comprise a plastic foil which extends in one plane or which may also be of a corrugated or cuved configuration. It is also possible for the strength supports of band or strip form to be provided with holes therein, into which the caoutchouc or rubber material of the pneumatic tire penetrates in order to produce a positive connection between the cauotchouc or rubber and the plastic foil, in addition to the welding which occurs upon vulcanisation of the tire. In any event however there is such an intensive weld between the plastic material of the strength supports of the transverse belt and the rubber surrounding same that, in the event of failure or overloading of the pneumatic tire, there is only a cohesive rupture in the rubber material, whereas adhesion as between the strength supports and the layers of rubber surrounding same remains undamaged.

Desirably, the strength supports of the transverse belt comprise a plastic material which is of a similar or even identical specific gravity to the rubber material of the tire so that the transverse belt does not cause any imbalance phenomena but so-to-speak may be integrated in a neutral condition in respect of weight into the rubber material of the pneumatic tire according to the invention.

A particularly suitable material for the plastic foil from which the strength supports in accordance with the invention of the transverse belt may be cut, stamped out or otherwise produced, is poly-(2,6-dimethyl-1,4-phenylene ether) or a composition containing that material. That material is of a very similar specific gravity to the rubber used in tire construction and is connected in an extremely strong and permanent fashion by mutual welding to the caoutchouc and rubber material itself, by way of a styrene-bearing medium or SBR-containing rubber material, as test have demonstrated, when vulcanising the tire, even when the surface of the strength supports which consist of that material and which are embedded into the tire is smooth and does not have any roughness, unevenness or holes. On the contrary, at the vulcanisation temperature, there is an intensive and intimate weld between the plastic material and the rubber material.

In regard to a belted tire whose peripheral belt is of inadequate transverse stiffness, for example if the strenght supports thereof extend in the zero degrees direction, the invention easily and desirably imparts both the desired peripheral stiffness and also a high degree of transverse stiffness thereto, by virtue of the addition of a novel transvers belt, so that the tire has good travel properties, low rolling resistance, a lower degree of internal working and a low tendency to wear, due to the only linear stretching or shortening phenomena when peripheral working occurs. In addition the mass of the belt to be deformed and therewith the weight thereof are considerably reduced. Added to that is the fact that the strength supports of the transverse belt, in band or strip form, which are to be incorporated in accordance with the invention and embedded into the rubber material of the pneumatic tire form a resilient penetration barrier in relation to foreign bodies such as nails or the like which penetrate into the tire through the contact or tread surface.

Figure 2:
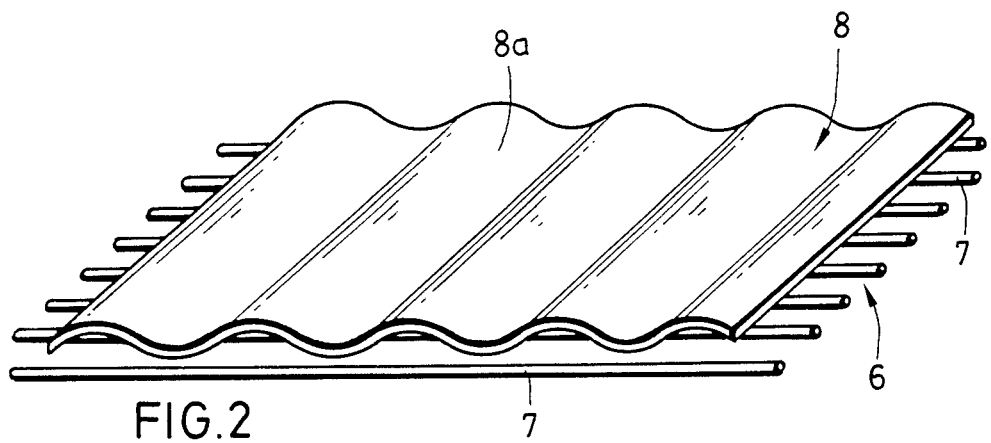
Figure 9:
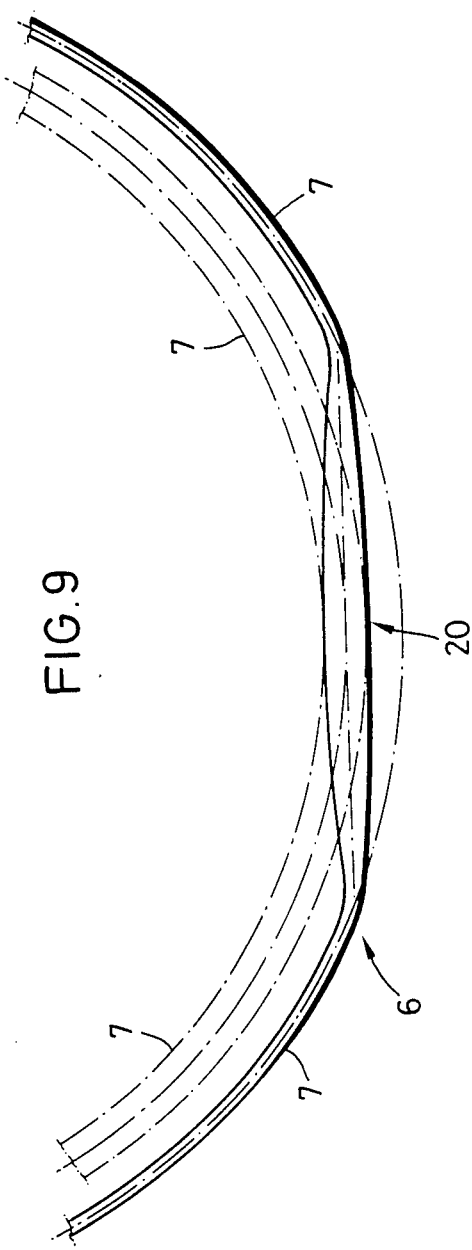

Embodiments of the belted tire for vehicles, constructed in accordance with the present invention, are diagrammatically illustrated in the drawings in which:

FIG. 1 is a view in cross-section through such a tire in which the transverse belt and the peripheral belt are particularly emphasised in order clearly to show same, FIG. 2 is a perspective view of part of the strength supports of the peripheral belt and the transverse belt in accordance with an embodiment of the invention, FIG. 3 is a perspective view of part of a transverse belt formed from three parallel corrugated bands, in accordance with another embodiment of the invention, FIG. 4 is a plan view of the peripheral belt and three strength supports of the transverse belt in accordance with a further embodiment of the invention, with the supports arranged in juxtaposed and parallel spaced-apart relationship and extending in transverse direction, FIGS. 5 and 6 are similar views to that shown in FIG. 4 of strength supports of the transverse belt, which are of a different configuration, FIGS. 7 and 8 are partial sections showing different arrangements and configurations of the strength supports of the transverse belt as shown in FIGS. 4 through 6, relative to the peripheral belt strength supports which extend in the zero degrees position or the peripheral direction of the tire, and FIG. 9 is a diagrammatic side view of the peripheral belt in the contact patch area, showing the behaviour of the strength supports of the peripheral belt.

The pneumatic tire 1 shown in FIG. 1 comprises a body 2 which is of a toroidal cross-section and which substantially comprises vulcanised caoutchouc or caoutchouc material, that is to say rubber or rubber material. Peripherally extending bead rings 3 are provided in the two beads of the tire 1, which bear against the rim (not shown) of a vehicle wheel after fitting of the tire. A cord insert 4 of the carcass, which may be of any desired configuration, provided for stabilisation purposes, extends between the bead rings 3 in the toroidal body 2, adjacent the inward side of the tire.

A peripheral belt 6 is embedded into the rubber material of the tire body 2, in the region of the outer contact or tread surface 5 of the tire 1. The peripheral belt 6 is formed by strength carriers or supports 7 which are arranged in spaced-apart and juxtaposed relationship and which are arranged in the so-called zero degrees position or which extend in the peripheral direction of the tire 1. The strength supports 7 may be textile cords, synthetic yarns or also metal wires. Arranged on one side of the strength supports 7 of the peripheral belt 6 and at a spacing therefrom are strength supports 8a of a transverse belt 8. Both the strength supports 7 and also the strength supports 8a are completely embedded into the rubber material of the body 2 and are intimately connected thereto.

Referring to FIG. 2, as shown therein the strength supports of the transverse belt 8 comprise a plastic foil which extends over the width of the peripheral belt 6 and which is disposed in the peripheral direction of the tire 1. The plastic foil so-to-speak extends parallel to the strength supports 7 of the peripheral belt 6 and is corrugated transversely with respect thereto. The foil may also be divided into a plurality of correspondingly corrugated bands 8a which are arranged in mutually parallel relationship, as shown in FIG. 3.

As shown in FIGS. 4 through 6, the strength supports of the transverse belt 8 are narrow elongate strips or bands which extend over the width of the tire 1 and thus transversely with respect to the numerous strength supports 7 of the peripheral belt 6, which are embedded into the tire body 2. FIG. 4 shows only the strength supports 7 of the peripheral belt 6, which are to be found in the end regions of the strength supports of the transverse belt 8, that is to say, for the sake of simplicity of the drawing, the further strength supports which are disposed between the strength supports 7 provided in the edge regions of the peripheral belt have been omitted.

FIG. 4 shows that the strength supports of the transverse belt 8, which are in band or strip form and which comprise a thin plastic foil are provided with a plurality of holes 9 which permit the caoutchouc or rubber material of the tire body 2 to pass therethrough. In many cases however those hole 9 are not required.

In the embodiment shown in FIG. 5 the strength supports 8a of the transverse belt 8 are of a crescent-like configuration while in the embodiment shown in FIG. 6 they are of a wedge-like configuration.

In the embodiment shown in FIG. 7 strip-like strength supports of a transverse belt are arranged both above and also below the strength supports 7 of the peripheral belt 6, more specifically in such a way that the strength supports of the two layers of the transverse belt 8 are so-to-speak displaced in mutually staggered relationship with each other and partially overlap only in their edge regions. Forces are transmitted between the individual supports 8a by way of short rubber bridges 8b which extend substantially normal to the supports 7 of the peripheral belt 6. Transverse stiffness is increased by the overlappings of the transverse belt supports 8a and the rubber bridges 8b therebetween.

In the embodiment shown in FIG. 8 the supports 8a of the transverse belt 8 are admittedly also arranged in two layers and are disposed in mutually displaced relationship with partial overlapping in the edge areas, but both layers of the transverse belt 8 are disposed on one side of the supports 7 of the peripheral belt 6.

Ay any event, in that arrangement the supports 7 of the peripheral belt 6 also contribute to increasing lateral stiffness as a result of the plate or sandwich effect produced thereby, or a resulting change in length (to which they put up a resistance).

In the embodiments shown in FIGS. 7 and 8, the bracing action of the supports 8a in the transverse direction is supported by the thrust shearing of the layer of rubber between the strip-like strength supports which are arranged in displaced and partially overlapping relationship in the two layers, thus producing something like the effect of a tank track. In the peripheral direction of the belted tire 1, the strength supports of the transverse belt 8, in conjunction with the rubber material therebetween, behaved in a sufficiently flexible fashion.

In the embodiment shown in FIG. 2 and similarly also in the embodiment shown in FIG. 3, the high bracing effect relative to transversely acting forces results from the geometrical profiling of the corrugated plastic foil 8a which is protected from displacement or warping because it is so-to-speak gripped in the tire material between the highway and the wheel load acting on the tire. In that connection it is supported by the strength supports 7 of the peripheral belt 6, which are subjected to a residual tensile stress. The corrugated form of the plastic foil may be so selected that, upon extension of the limitedly extensible peripheral belt 6, there are no stress peaks in the plastic foil 8a which is provided for transverse bracing.

FIG. 9 shows that the strength supports 7 of the peripheral belt 6 are extensible in the longitudinal direction. When the belted tire 1 is inflated, they are expanded or stretched from the position shown in dash-dotted lines, so they become of a larger diameter. The extensibility of the supports 7 is so selected that in the centre of the contact path area 20 of the belted tire 1, as a result of the flattening effect, they are subjected to return deformation approximately as far as the circular line where they would be disposed in the stress-free condition or if the tire 1 were not inflated. Thus the flattening of the tire 1 means that the supports 7 of the peripheral belt 6 are relieved of load until they are in a stress-free condition, but they are not subjected to compression or upsetting.

The invention improves belt constructions with inadequate transverse stiffness in a simple and effective manner so that the strength supports of the belt can be disposed in the zero degrees position. As, with such an arrangement, the supports 7 of the peripheral belt can be fully utilised for their actual function, namely providing for peripheral stiffness, the load-carrying cross-section of the belt and thus the weight thereof generally can be reduced. The supports 8a of the transverse belt 8 are so-to-speak homogeneously welded or integrated into the rubber material of the pneumatic tire and in addition to the transverse bracing effect also form a barrier to resist the penetration of foreign bodies, particularly if the transverse belt 8 is arranged between the tread surface 5 and the peripheral belt 6 of the tire.

It has been found particularly advantageous for a part of the peripheral belt to be resiliently stretchably formed for example from nylon cords or in a similar manner, while a further part of the peripheral belt is produced for example from material which is as non-stretchable as possible, such as aramide or glassfibre cord threads, or in a similar manner, in a 'flabby' fashion, that is to say with an available stretch which can be attributed to the construction and which is at least as great as the change in periphery when the tire experiences bulging in the tire press.

In that construction, due to the heat shrinkage of nylon, which is typical of the material, the finished tire is of a smaller periphery which, as a result of the operating conditions, increases due to resilient stretching of the nylon material, to such an extent as is permitted by the stretch-resistant parts of the peripheral belt.

In that connection, the stretchable nylon material first accommodates the tenisle stresses which occur, storing corresponding counteracting forces, that is to say in a similar manner to a spring, until finally, after the attainment of the degree of stretch which is desired from the point of view of the tire structure, of for example 3 to 5%, the high-strength stretch-resistant cord threads carry the further tensile stress. The abrupt limitation in peripheral growth of the tire, which is achieved in that way, also has a highly advantageous effect on lateral stiffness of the transverse belt as that prevents partial distortion phenomena, as may occur under conditions of travel on an incline, due to additional local overstretching of an unlimitedly stretchable belt.

What is claimed is:

1. A dual belted tire for vehicles comprising
   (a) a toroidal body of elastomeric material with a contact surface at the outer periphery.
   (b) a circumferentially extending annular belt construction which is embedded as an insert in the region of the contact surface in the material of the body and which comprises a first circumferential belt for circumferential stiffness and a second transverse belt for lateral stiffness, said belts being separate,
   (c) said circumferential belt having a number of annular strength supports which are arranged in the zero degrees position and in juxtaposed relationship at lateral spacings in at least one plane and which extend in the circumferential direction of the body,
   (d) said transverse belt having at least one transverse bracing strength support which extends substantially over the width of the contact surface and which is embedded in the elastomeric material in parallel relationship to and at a spacing from the circumferentially extending strength support of the circumferential belt,
   (e) said transverse belt including at least one corrugated plastic foil layer with the flutes aligned transversely to the zero degree annular stretch supports,
   (f) the transverse belt being stretchable in the circumferential direction of the tire at least as much as the strength supports of the circumferential belt.

2. A dual belted tire as claimed in claim 1 in which the annular strength supports of the circumferential belt are adapted to be extensible in their longtudinal direction in such a way that their operationally induced extension in the tire approximately corresponds to the return deformation which occurs in the region of the contact area of the tire.

3. A belted tire as claimed in claim 1 in which the strength supports of the transverse belt are arranged in at least one layer juxtaposed with respect to the strength supports of the circumferential belt.

4. A dual belted tire as claimed in claim 1 in which the transverse belt comprises a plurality of corrugated strips which are annularly arranged in juxtaposed relationship and which are embedded in the material of the tire body.

5. A dual belted tire as set forth in claim 1 in which the strength supports of the transverse belt comprise plastic material which has a similar or equal specific gravity to the rubber material of the tire body.

6. A dual belted tire as set forth in claim 1 in which the transverse bracing elements comprise poly-(2,6-dimethyl-1,4-phenylene ehter) and the adjoining rubber medium contains styrene.

* * * * *